United States Patent
Jahic et al.

(10) Patent No.: US 10,478,998 B2
(45) Date of Patent: Nov. 19, 2019

(54) PROCESS AND DEVICE FOR SEPARATION AND RECOVERY OF WASTE CARPET COMPONENTS

(71) Applicant: AquafilSLO d.o.o., Ljubljana (SI)

(72) Inventors: Denis Jahic, Ljubljana-Smartno (SI); Carlo Risatti, Ledro (IT); Damijan Marolt, Vrhnika (SI); Vid Margon, Vrhnika (SI)

(73) Assignee: AquafilSLO d.o.o. (SI)

( * ) Notice: Subject to any disclaimer, the term of this patent is extended or adjusted under 35 U.S.C. 154(b) by 79 days.

(21) Appl. No.: 15/667,789

(22) Filed: Aug. 3, 2017

(65) Prior Publication Data

US 2018/0339429 A1 Nov. 29, 2018

Related U.S. Application Data

(63) Continuation of application No. PCT/SI2017/000012, filed on May 29, 2017.

(51) Int. Cl.
  *B29B 17/02* (2006.01)
  *B29B 17/04* (2006.01)
  (Continued)

(52) U.S. Cl.
  CPC .............. *B29B 17/02* (2013.01); *B03B 9/06* (2013.01); *B03B 9/061* (2013.01); *B29B 17/04* (2013.01); *B03B 2009/067* (2013.01); *B29B 2017/0203* (2013.01); *B29B 2017/0224* (2013.01); *B29B 2017/0231* (2013.01);
  (Continued)

(58) Field of Classification Search
  CPC ......... B02C 23/18; B02C 23/06; B02C 23/08; B02C 23/22; B02C 23/36; B02C 17/002; B02C 17/007; B02C 17/02; B02C 17/10; B02C 18/062; B02C 18/2266; B03B 9/06; B29B 17/04; B29B 17/02
  See application file for complete search history.

(56) References Cited

U.S. PATENT DOCUMENTS 4,076,177 A * 2/1978 Hirayama ........... B02C 13/2804
                                                    241/32
4,161,294 A * 7/1979 Lautenschlager ....... B02C 13/08
                                                    241/191

(Continued)

*Primary Examiner* — Shelley M Self
*Assistant Examiner* — Sarkis A Aktavoukian
(74) *Attorney, Agent, or Firm* — Jovan N. Jovanovic; The Watson IP Group, PLC (57) ABSTRACT

A process for separation and recovery of waste carpet components, wherein waste carpets are predominantly composed of a face fiber material, a backing material and an adhesive coating which includes latex and filler. Virtually all of the filler, i.e. calcium carbonate, is removed prior to fine grinding and passing the mixture to a high speed centrifuge for separation of the face fiber material from the backing material. A high friction washer is disclosed which separates the face giver material, the backing material and the adhesive coating. The fine grinding of the material to be recycled may be done only once before passing the mixture to the centrifuge by which the loss of the fiber material is highly reduced before its separation into face fiber and backing material and also the life time of the fine grinder and the centrifuge can be prolonged.

20 Claims, 4 Drawing Sheets

(51) Int. Cl.
  *B03B 9/06* (2006.01)
  *B29K 105/26* (2006.01)
  *B29K 23/00* (2006.01)
  *B29K 27/06* (2006.01)
  *B29K 67/00* (2006.01)
  *B29L 31/00* (2006.01)

(52) U.S. Cl.
  CPC .............. *B29B 2017/0289* (2013.01); *B29B 2017/0428* (2013.01); *B29B 2017/0484* (2013.01); *B29K 2023/12* (2013.01); *B29K 2027/06* (2013.01); *B29K 2067/003* (2013.01); *B29K 2105/26* (2013.01); *B29L 2031/7322* (2013.01)

(56) References Cited

U.S. PATENT DOCUMENTS

| | | | | |
|---|---|---|---|---|
| 4,365,761 A * | 12/1982 | Danforth | ................ | D21B 1/347 241/21 |
| 4,399,948 A * | 8/1983 | Treffner | ................ | B02C 13/22 241/154 |
| 4,941,970 A * | 7/1990 | Ahs | ................ | D21D 5/00 209/234 |
| 5,215,269 A * | 6/1993 | Pozzato | ............. | B02C 13/1835 241/275 |
| 5,230,473 A * | 7/1993 | Hagguist | ................ | B03B 9/061 156/94 |
| 5,299,747 A * | 4/1994 | Satomi | .................... | D21B 1/14 241/46.17 |
| 5,598,980 A * | 2/1997 | Dilly-Louis | ............... | B03B 5/32 241/20 |
| 5,722,603 A * | 3/1998 | Costello | .................... | B03B 5/34 241/20 |
| 6,126,096 A * | 10/2000 | Robinson | ................ | B03B 9/061 241/19 |
| 6,713,112 B1 * | 3/2004 | Lucas | .................... | B01D 45/14 426/463 |
| 6,752,336 B1 * | 6/2004 | Wingard | ................ | B03B 9/061 241/20 |
| 7,152,742 B2 * | 12/2006 | Donaj | ....................... | B03B 1/04 209/176 |
| 7,635,099 B1 * | 12/2009 | Meredith | ................ | B03B 9/061 241/21 |
| 7,784,719 B1 * | 8/2010 | Wingard | ................ | B29B 17/02 241/20 |
| 7,905,435 B1 * | 3/2011 | Scepaniak | ............ | B02C 18/148 241/242 |
| 8,567,702 B2 * | 10/2013 | Kulesa | ................ | B29B 17/0026 241/19 |
| 9,308,673 B2 * | 4/2016 | Feng | .................... | B24B 27/033 |
| 9,550,872 B2 * | 1/2017 | Stone | ....................... | C08J 11/06 |
| 9,676,917 B1 * | 6/2017 | Tian | ........................ | C08J 11/06 |
| 2001/0023903 A1 * | 9/2001 | Korte | .................... | B02C 13/18 241/24.18 |
| 2011/0288188 A1 * | 11/2011 | Walters | .................. | B29B 17/02 521/40 |
| 2012/0228411 A1 * | 9/2012 | Andre | .................... | B01F 9/0007 241/3 |
| 2013/0327858 A1 * | 12/2013 | Rees | .................... | B02C 18/0084 241/24.1 |
| 2015/0102140 A1 * | 4/2015 | Van Den Berg | .... | B02C 18/0084 241/15 |
| 2016/0236208 A1 * | 8/2016 | Vicentini | .................. | B04B 3/04 |
| 2018/0127562 A1 * | 5/2018 | Tian | ........................ | C08J 11/06 |

* cited by examiner

PROCESS AND DEVICE FOR SEPARATION AND RECOVERY OF WASTE CARPET COMPONENTS

CROSS-REFERENCE TO RELATED APPLICATION

This application is a continuation of PCT/SI2017/000012 entitled "Process and Device for Separation and Recovery of Waste Carpet Components", filed May 29, 2017, the entire disclosure of which is hereby incorporated by reference in its entirety.

BACKGROUND

The present invention refers to a recycling process of waste carpets, i.e. post consumer carpets, wherein main components of the waste carpets are separated and recovered for further use thereof.

The majority of carpets are composed of a face fiber material such as nylon 6, nylon 66, polyester, polypropylene or other fibers embedded or tufted in a primary backing that contains polypropylene fabric as the backing material. After the face fiber is tufted through the primary backing, an adhesive coating is applied to the back side of the carpet for further holding the face fiber in place. The adhesive coating is typically composed of a latex, such as a styrene-butadiene rubber (SBR), ethylene vinyl acetate (EVA), etc. and includes inorganic materials as fillers, such as calcium carbonate, fly ash, clay or hydrated alumina. Before the adhesive coating is cured, a second fabric, commonly referred to as a secondary backing, is attached to the back of the carpet. The secondary backing is typically made of polypropylene fabric.

Typically the face fiber material represents 10-50 wt. % of the carpet, the balance being backing material and adhesive coating, i.e. latex and fillers, wherein the amount of the backing material is up to 20 wt. % of the carpet and the amount of the adhesive coating is between 40 to 50 wt. % of the carpet. Typically the adhesive coating is composed of 20 wt. % of latex and 80 wt. % of filler, preferably calcium carbonate, calculated to the amount of the adhesive coating.

Today only 1-3% of all the post consumer carpets in Europe are recycled, the majority of the waste carpets are sent to the landfill site or are incinerated. Since incineration is harmful for the environment and for the people there are incentives in some countries to legally prohibit the disposal of carpets in landfills and incineration thereof. Thus it will be even more desirable to develop practical and economical methods to recover the materials of carpet waste, especially the polymeric face fiber, which may be than depolymerized to yield a desired monomer, i.e. in the case of nylon 6 face fibers, a desired monomer to be recovered is ε-caprolactam.

Several recycling processes of waste carpets are proposed but they all have drawbacks.

One approach to recovery of materials, predominantly nylon from waste carpet involves depolymerization of essentially a whole carpet. This process is not suitable for all depolymerization processes as the primary and secondary backing fiber materials may interfere substantially with the depolymerization process, and thereby render the process uneconomical and impractical.

Other approaches involve an initial separation process wherein face fiber is at least partially separated from the backing material, and the separated face fiber material is then depolymerized to recover the desired monomer. One example of such a separation process involves mechanical shearing of carpet to remove a portion of the face fiber from the backing. Unfortunately, since a great deal of the face fiber is below the surface of the primary backing, much of the face fiber is not recovered by the shearing process. Also, mechanical shearing of face fiber from post-consumer carpet presents problems. The carpet must be fed to the shearing device flat and neatly spread out.

In U.S. Pat. No. 5,230,473 a method for reclaiming carpet is disclosed through a process which softens the latex adhesives with steam or water, then tears the face fiber out of the backings using a series of brushes and serrated rolls. This process suffers from deficiencies similar to the aforementioned shearing device.

In U.S. Pat. No. 5,722,603 a process for separating and recovering waste carpet material components, especially face fiber material, includes removing adhesive material from the waste carpet material feedstock to obtain a mixture containing face fiber material which is passed with a liquid medium to a hydrocyclone, where the solids in the mixture are separated on the basis of specific gravity, and recovered. The recovered components can then be processed into desired products. The proposed process requires multiple hydrocyclones in a cascade for adequate separation of main components.

SUMMARY OF THE DISCLOSURE

So there was a need to develop a recycling process and a device for separation and recovery of waste carpets which is efficient with very low material loss and wherein all main components are separated with very high yield. In the proposed process according to the invention practically all of the filler, i.e. calcium carbonate, is removed prior to fine grinding and passing the mixture to a high speed centrifuge for separation of the face fiber material from the backing material, thus there is no need for multiple centrifuge steps in a cascade for adequate separation of main components. In the proposed process the fine grinding of the material to be recycled is done only once right before passing the mixture to the centrifuge by which the loss of the fiber material is highly reduced before its separation into nylon and polypropylene and also the life time of the fine grinder and the centrifuge is prolonged. The material which passes to the centrifuge contains in this step only minimal amounts of the filler. Inorganic filler is hard and abrasive and can, if present in higher amounts, cause faster wear of the fine granulator and the centrifuge. The use of only one centrifuge makes the proposed process also cost effective.

In an aspect of the disclosure, the disclosure is directed to a process for separation and recovery of waste carpet components. The waste carpets predominantly comprise a face fiber material, a backing material and an adhesive coating which includes latex and filler. The process comprising the following steps: (a) shredding of waste carpets in a shredding machine wherein the size of the carpet is reduced to pieces; (b) washing of the waste carpets that have been shredded in the shredding step in a high friction washer, wherein due to the action of high friction forces and a washing agent, at least some of the adhesive coating is decoupled form the face fiber material and backing material; (c) removing at least some of the adhesive coating from the high friction washer during the step of washing through a sieve within the high friction washer; (d) fine wet grinding of the material obtained from the washing step in a wet granulator reduce the size of the face fiber material and the backing material; and (e) separating the material obtained in the step of fine wet grinding in a centrifuge into face fiber and backing material.

In some configurations, the process further comprises the steps of: (a) sieving the waste carpets that have been shredded in the shredding step, to, in turn, remove at least some of the adhesive coating therefrom; and (b) prewashing the waste carpets after sieving to remove at least some of the adhesive coating from the waste carpets, the step of prewashing occurring prior to the step of washing.

In some configurations, the process further includes the step of dewatering the material obtained from the washing step prior to the step of fine wet grinding, to, in turn reduce the washing agent content of the material to less than 55 wt. %.

In some configurations, up to 10 wt. % of the adhesive coating is removed during the step of sieving.

In some configurations, up to 5 wt. % of the adhesive coating is removed during the step of prewashing.

In some configurations, the sieve has at least one screen having a mesh size that is between 1 and 5 mm.

In some configurations, less than 2 wt. % of the face fiber material is lost in the step of shredding.

In some configurations, the washing agent comprises water.

In some configurations, the washing agent to waste carpet weight ratio is between 30:1 and 10:1.

In some configurations, the process further comprises the step of removing the adhesive coating from the washing agent obtained in the steps of washing, removing, fine wet grinding and separating.

In some configurations, the face fiber material comprises one of nylon 6, nylon 66, PET and PP.

In some configurations, the backing material comprises polypropylene, PET or other materials such as bitumen, and PVC.

In some configurations, the step of washing further comprises the steps of: providing a high friction washer, the high friction washer having an outer housing extending from a first end to a second end, and an inner drum rotatably positioned within the outer housing, the inner drum having an outer surface spaced apart from an inner surface of the outer housing, and the outer housing having a plurality of axially projecting friction pins each having a distal end; rotating the inner drum relative to the outer housing; directing the waste carpet through the high friction washer from an inlet to an outlet; and directing water into the outer housing during the step of directing the waste carpet.

In some configurations, during the step of rotation, the outer surface of the inner drum and the distal end of the axially projecting friction pins remain spaced apart from the inner surface of the outer housing.

In some configurations, the inlet is positioned proximate the first end of the outer housing and the outlet is positioned proximate the second end of the outer housing.

In some configurations, the outer housing has a length, and the inner drum has a diameter, the length of the housing being between two and four times the diameter.

In some configurations, the process further comprises the steps of: (a) providing a dry centrifugal separator; (b) directing the waste carpets that have been shredded in the shredding step through the dry centrifugal separator to, in turn, separate at least some of the adhesive coating therefrom; and (c) removing at least some of the adhesive coating that has been separated within the dry centrifugal separator.

In some such configurations, the dry centrifugal separator comprises a drum mounted on a rotating shaft that defines a shaft axis. The drum is equipped with a plurality of holders fixed to the shaft perpendicularly to the shaft axis and wherein a paddle is adjustably attached to each of the plurality of holders. Rotation of each of the paddles is facilitated along an axis which is perpendicular to the shaft axis and along an axis which is parallel to the shaft axis at an angle.

In some configurations, a bottom part of the drum is perforated to form a sieve having a mesh with a size between 1-5 mm.

In some configurations, the angle is between 0 and 45° and the rotating shaft has a rotation speed of up to 3000 revolutions per minute.

BRIEF DESCRIPTION OF THE DRAWINGS

The proposed process will be illustrated hereinafter by way of drawings, in which.

DETAILED DESCRIPTION OF THE DRAWINGS

For the purpose of this application the term face fiber material includes, but is not limited to nylon 6, nylon 66, polyester, polypropylene or other fibers, backing material is to be understood to include primary backing material and secondary backing material, the primary backing material typically includes polypropylene fabric as the backing material. For the purpose of this application secondary backing material typically comprises an adhesive coating, and the term adhesive coating is to be understood to include latex, typically SBR and filler, typically calcium carbonate. Among other materials, this second backing material may include PET or other materials such as bitumen and PVC, among others.

The process according to the invention includes the following steps:

A: shredding of waste carpets in a shredding machine wherein the size of the carpet is reduced to pieces with an average size of 5 to 10 cm, while both larger and smaller average sizes are contemplated, such as, for example, while not being limited there to, to sizes between 2 cm and 20 cm, and more preferably between 3 cm and 15 cm. Again these are exemplary, and sizes larger than 20 cm and smaller than 3 cm are contemplated. The size reduction serves to reduce the size of the waste carpet into sizes that are more easily managed in the later steps of the process and to initiate separation of the face fiber material and backing material from the adhesive coating. In this step any conventional, commercially available, size reduction equipment such as guillotines, rotary cutters, shear shredders, open rotor granulators, closed rotor grinders, and rotor shredding machines can be used so long as the size reduction operation does not produce a substantial amount of fine face fiber particles that can be lost in later operations to thus preclude their recovery. Preferably a single shaft shredder is used which provides less than 2 wt. % of fine face fiber particles loss because of the coarse, preferably, 5-10 cm shredding (or at the sizes identified above, without limitation).

B: sieving of the material obtained in step A through at least one screen that has a mesh size between 1-5 mm (while mesh sizes both greater than 5 mm and smaller than 1 mm are contemplated) and is designed to retain face fiber material and backing material while passing through the smaller particles of the adhesive coating, i.e. predominantly filler (calcium carbonate). In this step the majority of the material which represents the face fiber and the backing material remains on the mesh and is led further to step C. The residue which is predominantly filler, i.e. calcium carbonate, is removed so that up to 10 wt. % of the filler calculated to the weight of the carpet is removed from the material.

C: prewashing of the material obtained in step B in a pre-washer with a washing agent and wherein the material is wetted to reduce its volume. The pre-washer is preferably a low friction machine, a washing agent is preferably water. The weight ratio of water to material is between 30:1 and 10:1, preferably 10:1. In this step no size reduction takes place but due to the action of the internal parts of the pre-washer, the amount of the filler, i.e. calcium carbonate, is further reduced by maximum of additional 5 wt. % calculated to the weight of the carpet. Water which contains the filler is led to a single cone centrifugal separation wherein the filler is removed from water and water is recycled to the beginning of the washing process.

D: washing of the material obtained in step C is done in a high friction washer, wherein due to the action of high friction forces predominantly the filler is removed from the material. In this step no size reduction takes place and thus the loss of the fiber material is minimized. The amount of the filler in the material which passes to the next step is reduced to less than 3 wt. % calculated to the weight of the carpet. The washing agent is preferably water. In the high friction washer high friction between rotating drum which contains exchangeable pins and the cylinder with exchangeable friction plates to control the friction occurs. With such a design of the high friction washer no size reduction of the material takes place only the filler, which is still present in the material, is loosened and is removed from the material due to the action of high friction forces and water. In this step the rest of the filler, i.e. calcium carbonate, which is abrasive and have negative impact on further process steps, is removed from the material and thus possible negative impact is reduced. Water from the high friction washer which contains the filler is led to a single cone centrifugal separation wherein the filler is removed from water and water is recycled to the beginning of the washing process.

Figure 1:
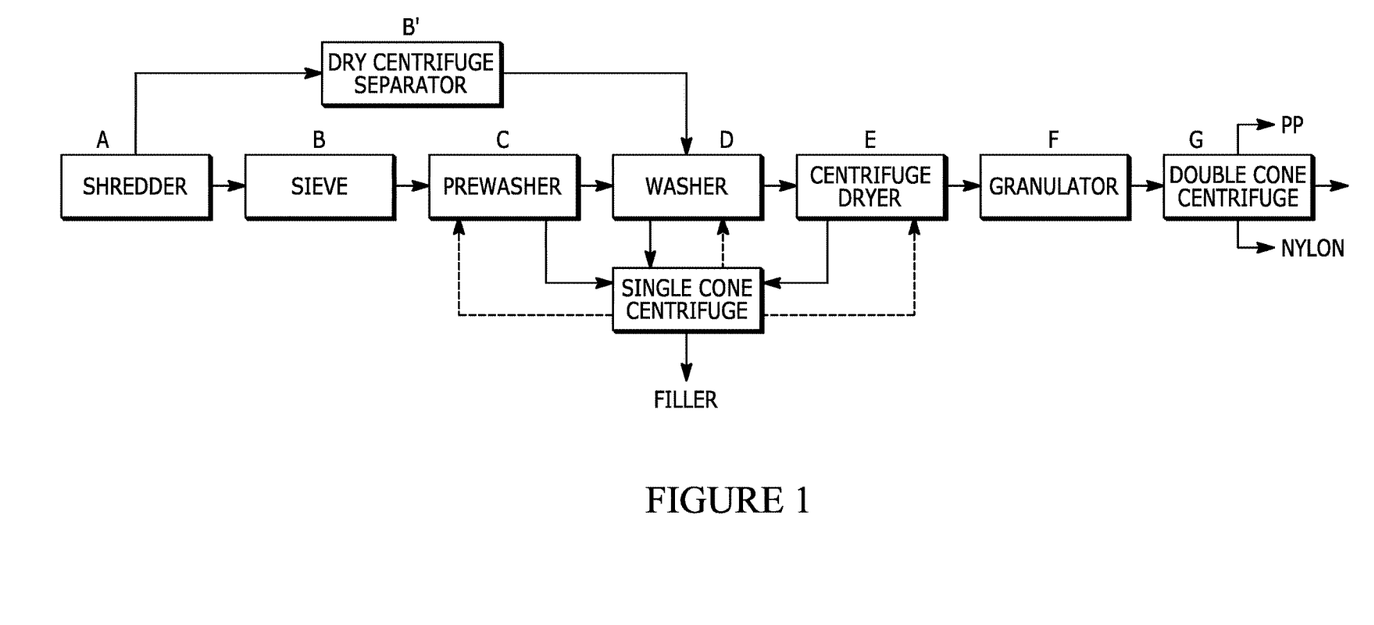
FIG. 1 represents a schematic diagram of the process of the invention.
Figure 2:
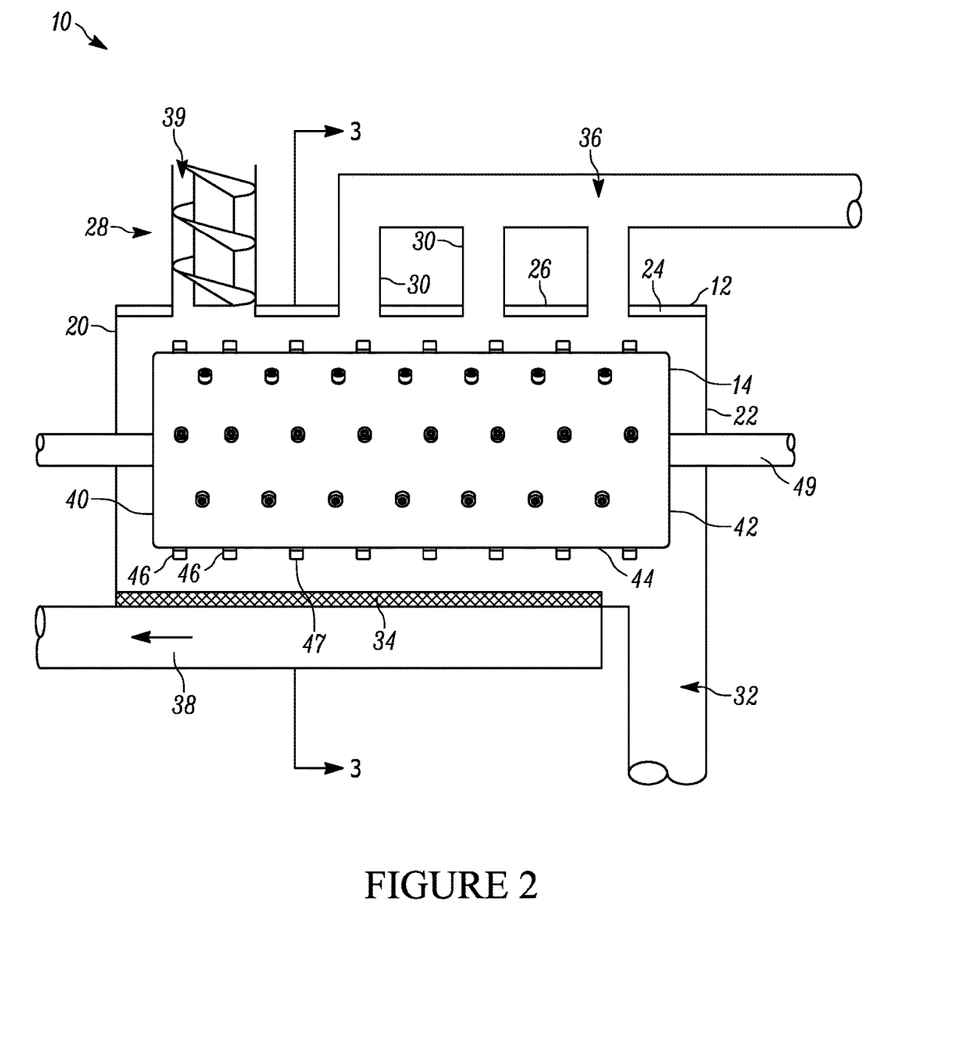
FIG. 2 represents a schematic cross sectional view of a high friction washer of the present disclosure.
Figure 3:
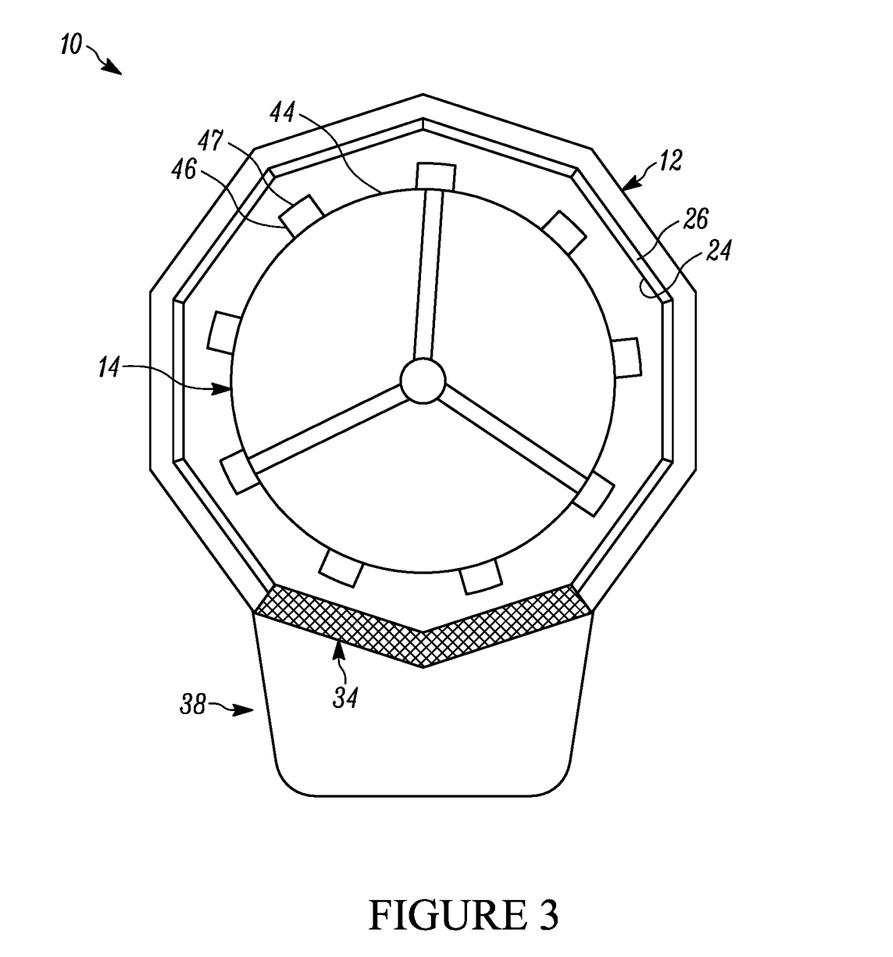
FIG. 3 represents a schematic cross-sectional view of a high friction washer of the present disclosure, taken generally about lines 3-3 of FIG 2.

One such configuration of the high friction washer 10 is shown in FIGS. 2 and 3 as comprising outer housing 12 and inner drum 14. The outer housing has a generally cylindrical configuration with a polygonal cross-sectional configuration (in this configuration, a ten sided cross-sectional configuration). The outer housing extends from first end 20 to second end 22, and includes inner surface 24. At or near the first end is a carpet inlet 28, with a carpet fiber outlet 32 at a second end 22. A plurality of water inlets 30 extend between the first and second ends (which may be fed separately, such as, in contemplated configurations, there are the pipes supplying washing water, or through a manifold, such as manifold 36). A sieve, such as a mesh screen or the like 34 is positioned within eh outer housing between the first and second ends, and preferably opposite the water inlets (although not required). A screw auger 39, or other device to urge carpet pieces into the outer housing may be employed. It will be understood that, in the configuration shown, the water inlets and the carpet inlet are both at or near the top end of the outer housing to allow for gravity to assist with passage through the system. The mesh screen 34, washing water containing filler outlet 38 and the carpet fiber outlet 32, are, for similar reasons at or near the bottom end of the outer housing. In other configurations, the position of these inlets and outlets can be varied.

A friction surface formed by a plurality of friction plates 26 applied or attached to the inner surface 24 is present along the inner surface between the first and second ends. The friction plates may be formed form such materials as stainless steel or the like. The surfaces have controlled friction as some of the friction plates are exchangeable and are intended to facilitate removing of the filler from the washing machine.

The inner drum 14 is shown in FIGS. 2 and 3 as comprising a generally cylindrical configuration having a substantially circular cross-sectional configuration. The inner drum extends from first end 40 to second end 42, and includes outer surface 44. At a plurality of locations, friction pins, such as friction pins 46 may extend radially outwardly from the outer surface 44, terminating at a distal end 47. In the configuration shown, the pins can be removably coupled to the outer surface 44.

With particular reference to FIG. 3, the outer surface 44 is maintained so as to rotate about an axis 49 which both defines the center of the cross-section of the outer housing and the inner drum. As can be seen, the outer surface 44 of the inner drum is spaced apart from the inner surface 24 of the outer housing. Similarly, the distal end 47 of the friction pins, are spaced apart from the inner surface 24 of the outer housing. For example, the outer surface of the inner drum and the inner surface of the outer housing can be separated by, for example, between 30 mm and 100 mm, and more preferably 60 mm. And, the distal end 47 is spaced apart from the inner surface by a distance of, for example, 3 to 30 mm, and more preferably about 7 to 11 mm. Additionally, the friction pins are spaced about the outer surface so that they are spaced apart from each other both axially and along the length thereof. For example, in the configuration shown, a total of nine friction pins extend outwardly from the outer surface axially, with 4 to 10 columns (which may be offset) extending along the length thereof. In the configuration shown, the length of the outer housing is between two and four times greater than the diameter of the inner drum (while variations are contemplated).

It will be understood that as the shredded carpet pieces enter into the inlet (or are directed by an auger, for example), they are directed into the outer housing and with the spinning inner drum, the carpet pieces are exposed substantially immediately to high friction between the pins and the outer housing and begin to circle around the washer. At the same time water is injected through the water inlets 30. As the carpet pieces circulate, they are agitated, as identified above, between the inner drum (and friction pins thereof) and the friction plates of the inner surface. Such a friction and agitation removes the adhesive coating (latex and filler, for example) with the water, and the adhesive coating particles with the water exits through the mesh screen and into the drain. Eventually, as more and more carpet pieces are introduced, carpet fibers and such exit the high friction washer through the carpet fiber outlet.

Advantageously, through this step, due in part to the spacing between the inner drum and its components and the outer housing, the carpeting is exposed to high friction which is generally a reason as to why the adhesive coating is decoupled and/or removed from the fibers. During the high friction action inside the washer, the adhesive coating is removed through the mesh screen, such that the outlet of the high friction washer is overwhelmingly fibers. Further still, the fibers retain their original length, the high friction washer (as compared to a pulper or the like) does not tend to cut the fibers. Any removed water and adhesive coating can be sent to recycling and recycled to remove and separate the water from the adhesive coating by the centrifuge.

E: dewatering of the material obtained in step D is carried out in a centrifuge dryer wherein the excess water is removed from the material. After dewatering the water content in the material is up to 55 wt. %, the rest, up to 45 wt. % are predominantly fibers of the face fiber material and the backing material, i.e. nylon and polypropylene fibers. Excess water which contain some filler is led to a single cone centrifugal separation wherein the filler is removed from water and water is recycled to the beginning of the washing process. Drying is preferably done in a centrifuge dryer or with screw press—dewatering.

F: fine wet grinding of the material obtained in step E in a wet granulator wherein the size reduction of the fibers takes place and wherein the size of the fibers is reduced to an average size of 10 mm. The reduction in fiber size is needed for effective separation of nylon fibers from polypropylene fibers in a further step. The fibers which come from step E are long because no size reduction was performed during prior steps of the process. Thus, the fibers of face fiber material which are predominantly of nylon and the fibers of backing material which are predominantly of polypropylene are mixed and tangled and the complete and effective separation in a later step without prior fine grinding would be incomplete and with very poor yield.

G: fluid separation of the material obtained in step F in a centrifuge, preferably double cone centrifuge, with water wherein with the forces in the centrifuge which reach several 1000 g, up to 3000 g, instant separation of nylon and polypropylene fibers takes place. The fluid separation of fibers based on different specific weight of nylon and polypropylene fibers in relation to water with the use of high g forces is known from the prior art. With this separation two phases are obtained, a heavy phase which contains pure nylon fibers with yield up to 95% and a lighter phase which contains pure polypropylene fibers with yield up to 97%.

H: recovery of separated nylon and polypropylene fibers for further processing, for example depolymerization of nylon fibers to caprolactam.

Figure 4:
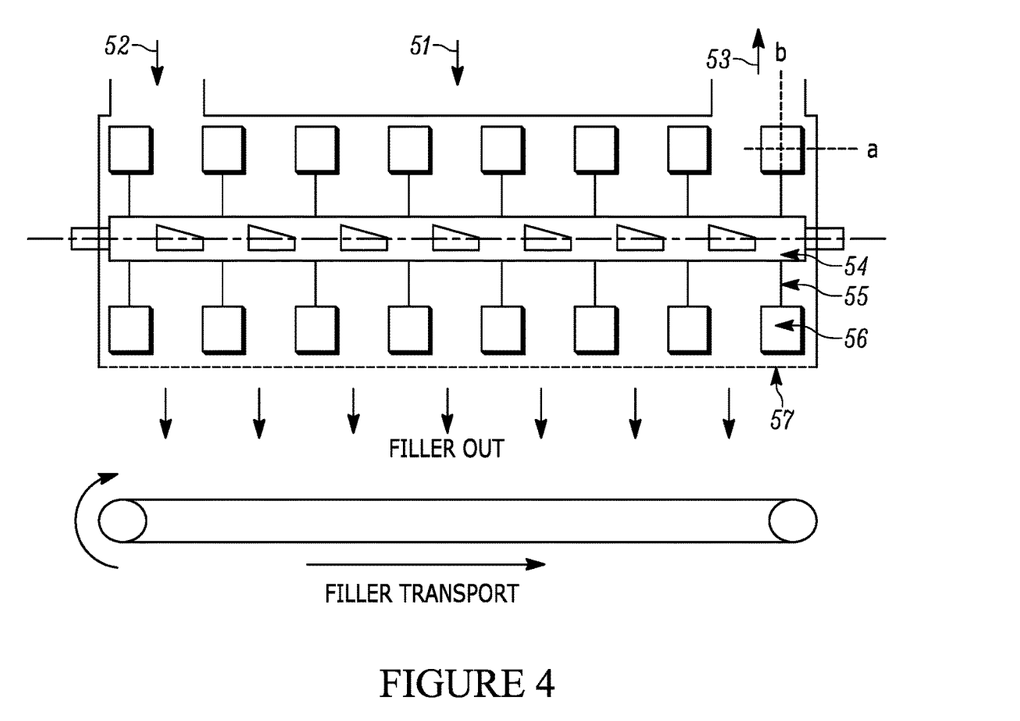
FIG. 4 represents a schematic cross-sectional view of a dry centrifugal separation machine.

Optionally instead of step B and C, i.e. the use of a sieve and a prewasher, the material obtained in step A is led to step B', to a dry centrifugal separation in a dry centrifugal separation machine 50 which is shown in FIG. 4. Instead of a two step process only one step is used for removal of the filler to reach 15 wt. % of filler in the carpet. In this step no size reduction of the material takes place. Dry centrifugal separation machine is in a form of a drum 51 mounted on a rotating shaft 54 equipped with holders 55 onto which paddles 56 are adjustably attached. The paddles 56 are adjustably attached on the holders 55 that are fixed to the shaft 54 perpendicularly to the shaft axis x. The distance between the holders 55 should be at least such as to enable the rotation of the paddles 56, preferably the holders 55 are fixed to the shaft 54 at regular intervals. The paddles 56 are adjustably fixed to the holder 55 in such a way that the smooth air flow facilitates the flow of the material through the machine. The paddles 56 are rotatable along both axes a, b, i.e. along the axis b which is perpendicular to the shaft axis x and along the axis which is parallel to the shaft axis x, at a certain angle, preferably at an angle between 0-45°. The shaft 54 with paddles 56 rotates with a speed up to 3000 RPM. The material obtained from step A, which is rich with the filler, enters the machine at an inlet 52 and travels along the shaft axis. The paddles 56 hit the material with a high speed and thus the removal of predominantly filler from the material is achieved. The bottom part 57 of the drum 51 is perforated to form a kind of a sieve with the mesh with the size between 1-5 mm. The material which is poor with the filler exits the machine through an outlet 53 and is led directly to step D. The paddles 56 are exchangeable due to the wear which appears because of friction caused by carpet fillers. The machine is thus designed to retain face fiber and backing material while passing through the smaller particles of the adhesive coating, i.e. predominantly calcium carbonate. In this step the majority of the material which represents the face fiber and the backing material remains on the mesh and is led further to step D. The residue which is predominantly calcium carbonate is removed so that up to 15 wt. % of the calcium carbonate calculated to the weight of the carpet still remains in the material. With such a design of the dry centrifugal separation machine no size reduction of the material takes place. Only the filler is loosened and is removed from the material and thus less than 2 wt. % of fine face fiber particles loss is achieved. In other configurations, the steps B, C and B' can be skipped, as can step E. That is, the steps can be limited to the high friction washing after shredding, and the wet grinding and separating.

In table 1 the yields of the recovery of waste carpet components after step G are presented and which confirm that practically all the filler was successfully removed prior to step F and G.

TABLE 1

|     | $CaCO_3$ content (of dry sample) [%] | PA6 content (of dry sample) [%] | Residue content (of dry sample) [%] |
| --- | --- | --- | --- |
| PA6 | 2.8 | 95.0 | 2.2 |
| PP  | 2.2 | 0.8  | 97.1 |
| PA6 | 2.4 | 94.9 | 2.7 |
| PP  | 1.8 | 1.5  | 96.7 |

What is claimed is:

1. A process for separation and recovery of waste carpet components, wherein waste carpets comprise a face fiber material, a backing material and an adhesive coating which includes latex and filler, said process comprising:
   shredding of waste carpets in a shredding machine, the shredding producing a shredded waste carpets;
   washing of the shredded waste carpets that have been shredded in the shredding with a liquid washing agent in a high friction washer without reducing a size of the shredded waste carpets, wherein due to the action of high friction forces and the liquid washing agent, at least some of the adhesive coating is decoupled from the face fiber material and backing material;
   removing at least some of the adhesive coating from the high friction washer during washing through a washing sieve within the high friction washer, the removing producing a first remaining material;
   fine wet grinding of the first remaining material obtained from the washing in a wet granulator to reduce the size of the face fiber material and the backing material, the fine wet grinding producing a second remaining material; and
   separating the second remaining material obtained in the fine wet grinding in a centrifuge into face fiber and backing material.

2. The process of claim 1 further comprising:
sieving the waste carpets that have been shredded in the shredding, to, in turn, remove at least some of the adhesive coating therefrom, the sieving occurring prior to the washing; and
prewashing the waste carpets with the liquid washing agent after the sieving to remove at least some of the adhesive coating from the waste carpets, the prewashing occurring prior to the washing.

3. The process of claim 2 further comprising dewatering the first remaining material obtained from the washing through removing the liquid washing agent prior to the fine wet grinding, to, in turn reduce the washing agent content of the first remaining material to less than 55 wt. %.

4. The process of claim 2 wherein up to 10 wt. % of the adhesive coating is removed during the sieving of the waste carpets.

5. The process of claim 2 wherein up to 5 wt. % of the adhesive coating is removed during the prewashing.

6. The process of claim 2 wherein the sieve has at least one screen having a mesh opening size that is between 1 and 5 mm.

7. The process of claim 1 wherein less than 2 wt. % of the face fiber material is lost in the shredding.

8. The process of claim 1 wherein the liquid washing agent comprises water.

9. The process of claim 1 wherein the liquid washing agent to waste carpet weight ratio is between 30:1 and 10:1.

10. The process of claim 1 further comprising:
removing the adhesive coating from the liquid washing agent obtained in the washing, removing, fine wet grinding and separating.

11. The process of claim 1 wherein the face fiber material comprises one of nylon 6, nylon 66, PET (Polyethylene terephthalate) and PP (Polypropylene).

12. The process of claim 11 wherein the backing material comprises polypropylene, PET (Polyethylene terephthalate) or other materials such as bitumen, and PVC (Polyvinyl chloride).

13. The process of claim 1 wherein the washing further comprises:
the high friction washer having an outer housing extending from a first end to a second end, and an inner drum rotatably positioned within the outer housing, the inner drum having an outer surface spaced apart from an inner surface of the outer housing, and the outer surface of the inner drum having a plurality of axially projecting friction pins each having a distal end;
rotating the inner drum relative to the outer housing;
directing the waste carpet through the high friction washer from an inlet to an outlet; and
directing water into the outer housing during the directing of the waste carpet.

14. The process of claim 13 wherein during the rotation, the outer surface of the inner drum and the distal end of the axially projecting friction pins remain spaced apart from the inner surface of the outer housing.

15. The process of claim 13 wherein the inlet is positioned proximate the first end of the outer housing and the outlet is positioned proximate the second end of the outer housing.

16. The process of claim 13 wherein the outer housing has a length, and the inner drum has a diameter, the length of the housing being between two and four times the diameter.

17. The process of claim 1 further comprising:
providing a dry centrifugal separator after the shredding;
directing the waste carpets that have been shredded in the shredding through the dry centrifugal separator to, in turn, separate at least some of the adhesive coating therefrom prior to the washing; and
removing at least some of the adhesive coating that has been separated within the dry centrifugal separator.

18. The process of claim 17 wherein the dry centrifugal separator comprises: a drum mounted on a rotating shaft that defines a shaft axis, the drum equipped with a plurality of holders fixed to the shaft perpendicularly to the shaft axis and wherein a paddle is adjustably attached to each of the plurality of holders and rotation of each of the paddles is facilitated along an axis which is perpendicular to the shaft axis and along an axis which is parallel to the shaft axis at an angle.

19. The process of claim 18 wherein a bottom part of the outer housing is perforated to form a sieve having a mesh with an opening size between 1-5 mm.

20. The process of claim 18 wherein the angle is between 0 and 45° and the rotating shaft has a rotation speed of up to 3000 revolutions per minute.

\* \* \* \* \*